UNITED STATES PATENT OFFICE.

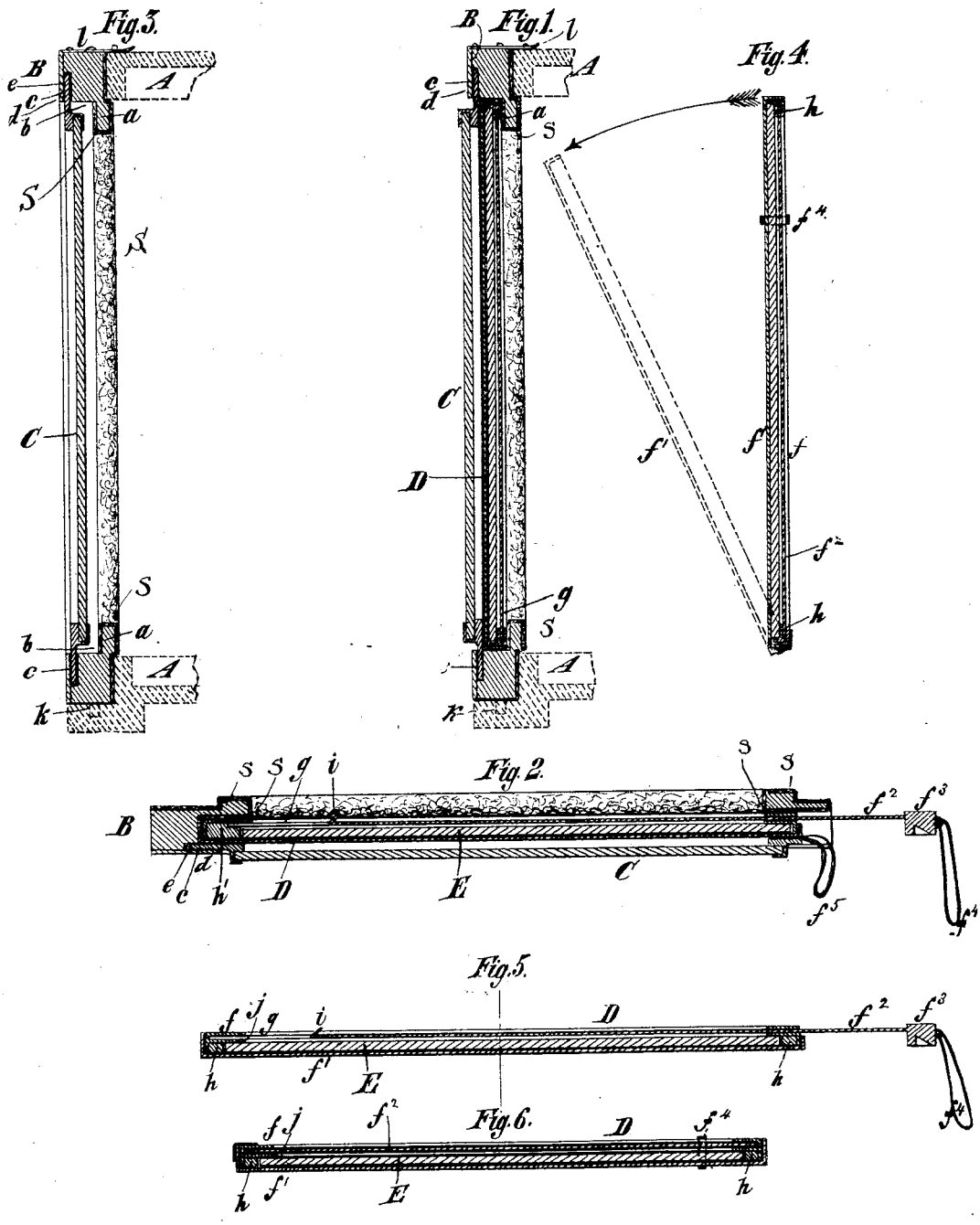

JOHN BARNETT, OF NEW YORK, N. Y.

PLATE-HOLDER FOR PHOTOGRAPHIC CAMERAS.

SPECIFICATION forming part of Letters Patent No. 271,402, dated January 30, 1883.

Application filed August 7, 1882. (No model.)

*To all whom it may concern:*

Be it known that I, JOHN BARNETT, of New York, in the county and State of New York, have invented a certain new and useful Improvement in Plate Holders or Shields for Photographic Cameras, of which the following is a specification.

This improvement consists in a plate holder or shield comprising two shallow boxes, made of card-board or like material, and hinged together, one provided with guides or frames for a sensitized plate and shutter and the other adapted to close and lap over the edge portion of the former and make a lap-joint therewith.

The improvement also consists in the combination, in a plate holder or shield, of a shallow box having an opening in the front, a dark slide or shutter fitted to said box, a stopper, a cover hinged to the back of the box, and an elastic band serving to secure the cover, dark slide or shutter and stopper in place.

The improvement also consists in a plate-holder frame covered or faced with a soft material over all the surface which is designed to be in contact with the camera, such soft material serving as a packing to prevent the entrance of light between the frame and camera.

The improvement also consists in the combination of a camera, a frame detachably fitted thereto, and a plate holder or shield detachably fitted in said frame, the said frame being covered with a soft material over all its surface which is in contact with the said camera and plate holder or shield.

The improvement also consists in the combination, with a frame, of a focusing-plate having a flange approximately coincident with one face and adapted to be fitted into the frame so that the face of the plate will occupy a position corresponding to that which the face of a sensitized plate in a plate holder or shield would occupy, or to be reversed and fitted into the frame so that it will not interfere with the insertion of the plate holder or shield.

In the accompanying drawings, Figure 1 is a transverse section of a plate-holder and supporting-frame embodying my improvement. Fig. 2 is a horizontal section of the same. Fig. 3 is a transverse section of the frame and focusing-plate. Fig. 4 is a transverse section of the plate-holder. Fig. 5 is a horizontal section of a plate-holder slightly modified in form, and Fig. 6 is a transverse section of the same.

Similar letters of reference designate corresponding parts in all the figures.

A designates a frame, of wood or other suitable material, located at the rear end of the body of a photographic camera, which may be of any approved form.

B designates a frame, which serves to support the focusing-plate C and sensitized-plate holder or shield D in position at the rear of the camera. This frame may be made of wood, and has at the front a beading, *a*, which fits snugly into the frame A. The frame B is covered with soft material S—such as flannel—over all its surface which is in contact with the camera-frame A and plate holder or shield D, and prevents the entrance of light between the frame B and camera A, as also between the frame B and plate holder or shield D. At the back the frame B is provided with a rabbet, *b*, and a shallower rabbet, *c*. A rim, *d*, which may be made of any thin material—such, for instance, as cardboard—is fitted to the back of the frame in rear of both rabbets. The plate-holder D fits in the rabbet *b*, being held therein by the rim *d*.

The focusing-plate is made of glass, as usual. It is provided with a flange, *e*, which may be made of sheet metal or other suitable strong thin material, and secured to the plate by being attached to a frame inclosing the edges of the glass, or in any other suitable manner. The flange *e* is approximately coincident with the rear of the glass. Hence when the plate is introduced into the frame B, with its flange *e* in the rabbet *c*, the face of the plate will occupy about the same position as that of a sensitized plate in the plate-holder, as may be seen in Fig. 3. When the plate-holder is to be inserted the focusing-plate is removed; but it may be reinserted with its face turned to the rear, as shown in Figs. 1 and 2, for it will not then interfere with the plate-holder, but will aid in retaining it in the frame B.

It is perhaps needless to remark that the rabbets *b c* are open at one end to permit the insertion and removal of the focusing-plate and sensitized-plate holder.

I will now describe the plate holder or shield in detail. It consists essentially of two shallow boxes, *f f'*, which may be made of cardboard, sheet metal, or other thin and light material, and are hinged together by a connecting-piece, of flexible material or otherwise, so that when they are shut together the part $f'$ will close or lap over the sides and ends, or the entire outer edge of the part $f$, and form a close joint, which will exclude light. The box $f$ is at the front and the box $f'$ is at the back of the plate holder or shield. The front of the box $f$ has an opening, $g$, suitable for the exposure of the sensitized plate. The back of the box $f'$ is imperforate.

In the box $f$ is a frame, $h$, which may be made of light strips of wood secured by an adhesive substance or otherwise to the ends and sides of the said box in such position that between it and the front of the box there will be left a slideway for the accommodation of a dark slide or shutter, $f^2$. This slideway extends through the outer end of the box $f$ to admit of the insertion and removal of the dark slide or shutter, and the corresponding end of the box $f'$ is shown as mortised to fit over the dark slide or shutter when it is in place. The strip $h'$ of the frame $h$, located at the opposite end of the box $f$, is shown as equal in thickness to the interior of the box, and as rabbeted to form a continuation of the slideway.

E is the sensitized plate. It fits between the outer end of the box $f$ and the rail $h'$ of the frame $h$, and lies against the back of the other rails of the frame.

The office of the dark slide or shutter is to exclude light from the sensitized plate until the plate is to be used.

The dark slide or shutter may be made of card-board or other suitable thin material. It is provided at the other end with a stopper, $f^3$, which may by made of wood and excludes light from the slideway in which the dark slide or shutter works.

At the inner end the dark slide or shutter is preferably provided with a stop for preventing it from being drawn entirely out of its slideway. Such stop may consist of a lip, $i$, made of the same material as the dark slide or shutter, and turned or bent over.

The stopper $f^3$ is provided with an elastic band of india-rubber, $f^4$, or other suitable material, which may be slipped over the boxes $f$ $f'$ to keep them closed and to retain the dark slide or shutter and stopper in place. This elastic band may be secured to the stopper by a staple, as shown.

The plate holder or shield may have a tab, $f^5$, whereby it can be conveniently pulled out of the frame.

The plate holder or shield shown in Figs. 5 and 6 is in general construction like the one already described. Hence I need only describe the features wherein it differs.

The box $f$ has a frame, $h$, which is of the same thickness as its interior, save that the rail which is at the outer end of the box is cut away to accommodate the dark slide or shutter $f^2$.

The slideway for the dark slide or shutter is formed partly by the front of the box and partly by a frame, $j$, of card-board or other suitable material, secured to the frame $h$. The sensitized plate E rests on the frame $j$ and fits snugly within the frame $h$.

It will be seen that the frame B and the plate holder or shield D together take the place of the plate holders or shields ordinarily used.

Any number of my plate-holders may be used with the same frame.

It is obvious that my plate holders are light, cheap, and exceedingly compact, and that a large number can be conveniently carried with a single frame for holding them.

The box $f'$ of my plate holder or shield constitutes a cover for the other box, $f$. The two boxes may be regarded as a case.

The frame B may be held in place by pins $k$ entering recesses in the bottom and a catch, $l$, at the top.

I desire to claim covering with a soft material not only the particular plate-holder frame shown and described, but even one which is a permanent part of the plate-holder.

What I claim as my invention, and desire to secure Letters Patent, is—

1. A plate holder or shield comprising two shallow boxes made of card-board or like material and hinged together, one provided with guides or frames for a sensitized plate and shutter and the other adapted to close or lap over the entire edge portion of the former and make a lap-joint therewith, substantially as specified.

2. In a plate holder or shield, the combination of a shallow box having an opening in the front, a dark slide or shutter fitted to said box, a stopper, a cover hinged to the back of the box, and an elastic band serving to secure the cover, dark slide or shutter, and stopper in place, substantially as specified.

3. A plate-holder frame covered or faced with a soft material over all the surface which is designed to be in contact with a camera, such soft material serving as a packing to prevent the entrance of light between said frame and the camera, substantially as specified.

4. The combination of a camera, a frame detachably fitted thereto, and a plate holder or shield detachably fitted in said frame, the said frame being covered with a soft material over all the surface which is in contact with said camera and said plate holder or shield, substantially as specified.

5. The combination, with a frame, of a focusing-plate having a flange approximately coincident with one face, and adapted to be fitted into the frame so that the face of the plate will occupy a position corresponding to that which the face of a sensitized plate in a plate holder or shield would occupy, or to be reversed and fitted into the frame so that it will not interfere with the insertion of the plate holder or shield, substantially as specified.

JOHN BARNETT.

Witnesses:
FREDK. HAYNES,
ED. L. MORAN.